Patented Nov. 15, 1927.

1,649,000

UNITED STATES PATENT OFFICE.

HORACE A. SHONLE, OF INDIANAPOLIS, INDIANA, ASSIGNOR TO ELI LILLY AND COMPANY, OF INDIANAPOLIS, INDIANA, A CORPORATION OF INDIANA.

CALCIUM PREPARATION.

No Drawing.   Application filed January 9, 1926.   Serial No. 80,352.

It is the object of my present invention to produce a stable preparation of calcium combined with certain degradation products of sugar, which calcium preparation may safely be kept in aqueous solution without deterioration and without the formation of sediment, and which even after being so kept will be directly suitable for intravenous injection.

By my present invention, it becomes possible to prepare this sugar-calcium product accurately and completely in the laboratory, and to preserve it in condition for direct use by the physician, so that the physician will not have to do anything in the way of preparation of the solution when he wishes to inject it intravenously.

It has long been known that certain sugars, such as dextrose, suffer a progressive degradation in the presence of calcium hydroxide; the sugar forming progressively (along with other products) various acids, which combine with the calcium present to form calcium salts of such acids. As long as any unneutralized calcium hydroxide remains, the degradation of the sugar and its derivatives continues. Further, even if all the calcium hydroxide present is neutralized by the acids formed as a result of the degradation of the sugar, so that no unneutralized calcium hydroxide remains, the product is nevertheless unfit for intravenous injection, especially after standing, because of the gradual formation over a considerable period of time of a sludge-like precipitate; for it is well understood that it is undesirable to give intravenous injections of solutions containing solid matter.

By my present invention, I permit the degradation of the sugar by the calcium hydroxide to proceed to the desired point; and then take suitable steps to prevent either the further degradation of the sugar and its derivatives or the formation of such a precipitate. I do this, furthermore, without adding anything to the solution of the calcium-preparation that would modify its physiological and therapeutic effect.

More specifically, I add a suitable sugar (desirably dextrose) to a suspension of calcium hydroxide in water. The resultant solution is initially alkaline; and therefore the hexose and the calcium hydroxide react. I permit this reaction to proceed, desirably under heat, until the alkalinity of the solution has been reduced to the desired point. In other words, I permit the degradation to proceed until the desired part of the calcium hydroxide has been neutralized by the acids formed as the result of the degradation of the sugar by the calcium hydroxide; though there is still unneutralized calcium hydroxide remaining. Then I precipitate this unneutralized calcium hydroxide by some suitable calcium-precipitant, such as oxalic acid, sulphuric acid, or phosphoric acid. The amount of precipitant added is carefully computed to be substantially just enough to precipitate the calcium of the unneutralized calcium hydroxide. Any of the three precipitants named cause the formation of only water in addition to the calcium salt of the precipitating acid; and as the precipitation of the calcium of the unneutralized calcium hydroxide is almost 100% complete with any of the precipitants named, the only thing added to the solution as by the precipitating reaction is a little more water.

The precipitation of the calcium by the calcium-precipitant not only stops the degradation of the sugar, but also carries down and removes from the solution the other matter present which would in time form the sludge-like precipitate. This other matter consists of by-products of the sugar degradation, and is in the form of suspended colloidal matter which in time would settle out to form the undesirable precipitate if not thus removed. Thus the precipitation serves a two-fold purpose: first, of stopping the degradation of the sugar at the desired point; and, second, of purifying the solution by removing therefrom contaminating matter which tends to form the sludge-like precipitate.

In this way, it becomes possible to administer calcium intravenously in an effective manner without the complications which frequently occur upon the intravenous injection of calcium in other forms.

The sugar which I use may be any sugar containing a free aldehyde or ketone group, and especially a hexose; and dextrose is the most desirable sugar.

In proceeding with the degradation of the dextrose, considered more specifically, I prepare a water suspension of calcium hydroxide, and add the dextrose gradually thereto, with constant stirring. I have found that it is very effective to use the ingredients in the proportions of 200 pounds of water, 54 pounds of dextrose, and 9 pounds of calcium oxide. I can vary these amounts and proportions, but the calcium oxide should be in sufficient amount so that in the initial mixture there is at least one part of calcium hydroxide to 15 parts of dextrose; and I prefer to use at least one part of calcium hydroxide to from 4 to 8 parts of dextrose. The addition of the dextrose to the water suspension of calcium hydroxide serves to get the calcium hydroxide completely in solution at the start.

After getting this water solution containing the dextrose and calcium hydroxide, I may let it stand until the desired degradation occurs. I prefer, however, to accelerate the degradation by mild heat, at about 40° C. Whether I heat the solution or not, I let the degradation of the sugar proceed to a point at which the alkalinity of the solution has been reduced to a fairly definite point, which is desirably about 10% of the original alkalinity of the solution of dextrose and calcium hydroxide, although it may vary between 5% and 25% of the original alkalinity. The alkalinity is conveniently determined by titration with phenolphthalein as an indicator.

By letting the alkalinity proceed to about 10% of the original alkalinity, with the initial proportions of the ingredients given, each c. c. of the solution contains between 0.0038 g. and 0.0055 g. of unneutralized calcium hydroxide. The initial content of such unneutralized calcium hydroxide was approximately 0.046 g. to 0.050 g. per c. c.

When the desired alkalinity is reached, the unneutralized calcium hydroxide is immediately precipitated, by the addition of the desired calcium-precipitant—oxalic acid, sulphuric acid, or phosphoric acid. I prefer oxalic acid, because, since calcium oxalate is almost absolutely insoluble, the calcium precipitation by oxalic acid is practically a complete one. The oxalic acid is preferably added in the form of a concentrated water solution. The amount of oxalic acid to be added is carefully calculated from the aforesaid titration, and a very slight excess of the oxalic acid is added beyond the molecular proportions required to neutralize the calcium hydroxide. In consequence, no unneutralized calcium hydroxide will remain in the solution, the slight excess of oxalic acid will react with enough of the calcium salts of the sugar-degradation acids to dispose of all such excess as calcium oxalate, and there will be a trace of such sugar-degradation acids remaining. Following the precipitation, the solution should thus be faintly acid, to avoid any possible alkalinity; because if the solution remains alkaline further precipitation will occur.

The calcium oxalate (or calcium sulphate or calcium phosphate) which is formed by the reaction of the calcium-precipitant with the unneutralized calcium hydroxide slowly settles out, during some days' standing. This precipitate as it settles out carries down with it the co-present colloidal matter already referred to.

After the precipitation of the calcium oxalate (or other insoluble calcium salt), the solution is carefully separated from the precipitate, conveniently by decanting. The decanted liquor is centrifuged repeatedly until clear; boiled for about an hour, desirably in an enamel-lined still, to coagulate any remaining traces of colloidal matter; and then filtered until clear.

This solution is assayed for total calcium; is diluted to the proper concentration of calcium to get the desired therapeutic dose of calcium in a quantity of liquid of convenient size; and may then be sterilized, conveniently by being passed through a Berkefeld filter. It is then put up in ampoules in convenient units for dispensing.

This solution is suitable for intravenous injection, and will remain so, without further treatment, for a considerable period. I have kept such solutions for many months, and found them to remain brilliantly clear throughout that time. Some of the solutions have now been kept for as long as four months without even any perceptible cloudiness.

This solution contains calcium combined with degradation products of dextrose; and is suitable for administration intravenously in the treatment of any diseases where calcium is indicated.

I claim as my invention:

1. The method of preparing a product of calcium and degradation products of a sugar having a free aldehyde or ketone group, comprising forming a solution containing said sugar and calcium hydroxide, permitting degradation of the sugar to proceed to an intermediate point at which some unneutralized calcium hydroxide still remains, adding a calcium precipitant substantially in sufficient amount to precipitate the calcium of the unneutralized calcium hydroxide while leaving neutralized calcium in solution, and separating such precipitate from the liquid.

2. The method of preparing a product of calcium and degradation products of a hexose, comprising forming a solution containing said hexose and calcium hydroxide, permitting degradation of the hexose to proceed to an intermediate point at which some unneutralized calcium hydroxide still remains, adding a calcium precipitant substantially in sufficient amount to precipitate the calcium of the unneutralized calcium hydroxide while leaving neutralized calcium in solution, and separating such precipitate from the liquid.

3. The method of preparing a product of calcium degradation products of dextrose, comprising forming a solution containing said dextrose and calcium hydroxide, permitting degradation of the dextrose to proceed to an intermediate point at which some unneutralized calcium hydroxide still remains, adding a calcium precipitant substantially in sufficient amount to precipitate the calcium of the unneutralized calcium hydroxide while leaving neutralized calcium in solution, and separating such precipitate from the liquid.

4. The method of preparing a product of calcium and degradation products of a sugar having a free aldehyde or ketone group, comprising forming a solution containing said sugar and calcium hydroxide in sufficient amount to produce degradation of the sugar to the desired point, producing in such solution a purifying precipitation which carries down the by-products of the sugar degradation, and removing such precipitate from the solution.

5. The method of preparing a product of calcium and degradation products of a hexose, comprising forming a solution containing said hexose and calcium hydroxide in sufficient amount to produce degradation of the hexose to the desired point, producing in such solution a purifying precipitation which carries down the by-products of the hexose degradation, and removing such precipitate from the solution.

6. The method of preparing a product of calcium and degradation products of dextrose, comprising forming a solution containing said dextrose and calcium hydroxide in sufficient amount to produce degradation of the dextrose to the desired point, producing in such solution a purifying precipitation which carries down the by-products of the dextrose degradation, and removing such precipitate from the solution.

7. A calcium preparation, comprising the final solution resulting from the method set forth in claim 1.

8. A calcium preparation, comprising the final solution resulting from the method set forth in claim 2.

9. A calcium preparation, comprising the final solution resulting from the method set forth in claim 3.

10. A calcium preparation, comprising the final solution resulting from the method set forth in claim 4.

11. A calcium preparation, comprising the final solution resulting from the method set forth in claim 5.

12. A calcium preparation, comprising the final solution resulting from the method set forth in claim 6.

13. A calcium preparation, comprising a compound of calcium with the acids formed by degradation by calcium hydroxide of a sugar having a free aldehyde or ketone group and the removal of the calcium of any unneutralized calcium hydroxide.

14. A calcium preparation as set forth in claim 13, with the addition that the sugar from which such acids are derived is a hexose.

15. A calcium preparation as set forth in claim 13, with the addition that the sugar from which such acids are derived is dextrose.

16. A calcium preparation, comprising a compound of calcium with the acids formed by degradation by calcium hydroxide of a sugar having a free aldehyde or ketone group and the removal of the colloidal by-products of such degradation.

17. A calcium preparation as set forth in claim 16, with the addition that the sugar from which such acids are derived is a hexose.

18. A calcium preparation as set forth in claim 16, with the addition that the sugar from which such acids are derived is dextrose.

In witness whereof, I have hereunto set my hand at Indianapolis, Indiana, this 4th day of January, A. D. one thousand nine hundred and twenty-six.

HORACE A. SHONLE.